United States Patent
Björklund et al.

(10) Patent No.: US 9,851,150 B2
(45) Date of Patent: Dec. 26, 2017

(54) METHOD AND ARRANGEMENT FOR FEEDING FINE-GRAINED MATTER TO A CONCENTRATE BURNER OR A MATTE BURNER OF A SUSPENSION SMELTING FURNACE AND CONTROLLING MEANS AND COMPUTER PROGRAM PRODUCT

(71) Applicant: Outotec (Finland) Oy, Espoo (FI)

(72) Inventors: Peter Björklund, Espoo (FI); Tapio Ahokainen, Helsinki (FI); Markku Ylönen, Vantaa (FI)

(73) Assignee: Outotec (Finland) Oy, Espoo (FI)

( * ) Notice: Subject to any disclaimer, the term of this patent is extended or adjusted under 35 U.S.C. 154(b) by 205 days.

(21) Appl. No.: 14/421,972

(22) PCT Filed: Sep. 18, 2013

(86) PCT No.: PCT/FI2013/050901
§ 371 (c)(1),
(2) Date: Feb. 16, 2015

(87) PCT Pub. No.: WO2014/044910
PCT Pub. Date: Mar. 27, 2014

(65) Prior Publication Data
US 2015/0211798 A1    Jul. 30, 2015

(30) Foreign Application Priority Data
Sep. 19, 2012   (FI) ..................................... 20125966

(51) Int. Cl.
*F27D 3/08*   (2006.01)
*G01F 1/86*   (2006.01)
(Continued)

(52) U.S. Cl.
CPC .............. *F27D 3/08* (2013.01); *B65G 33/14* (2013.01); *B65G 43/08* (2013.01); *F27B 1/20* (2013.01);
(Continued)

(58) Field of Classification Search
CPC ........... B65G 33/14; B65G 43/08; F27B 1/20; F27D 19/00; F27D 3/0025; F27D 3/0033;
(Continued)

(56) References Cited

U.S. PATENT DOCUMENTS 5,196,050 A    3/1993   Taniyoshi
6,168,305 B1   1/2001   Marmsater
(Continued)

FOREIGN PATENT DOCUMENTS

EP    0631115 A2   12/1994
FR    2572520 A1    5/1986
(Continued)

OTHER PUBLICATIONS

Extended European Search Report prepared by the European Patent Office for EP13839690, dated Apr. 4, 2016, 5 pages.
(Continued)

*Primary Examiner* — Scott Kastler
*Assistant Examiner* — Michael Aboagye
(74) *Attorney, Agent, or Firm* — Chernoff Vilhauer LLP

(57) ABSTRACT

The invention relates to a method and to an arrangement for feeding fine-grained matter to a concentrate burner (1) or a matte burner of a suspension smelting furnace (2). The invention relates also to a controlling means for controlling feeding of fine-grained matter to a concentrate burner (1) or a matte burner of a suspension smelting furnace (2) in an arrangement for feeding fine-grained matter to a concentrate burner (1) or a matte burner of a suspension smelting furnace (2). The invention relates also to controlling means for
(Continued)

controlling feeding of fine-grained matter to a concentrate burner (1) or a matte burner of a suspension smelting furnace (2) in an arrangement for feeding fine-grained matter to a concentrate burner (1) or a matte burner of a suspension smelting furnace (2) and to a computer program product.

11 Claims, 3 Drawing Sheets

(51) Int. Cl.

| | |
|---|---|
| *B65G 43/08* | (2006.01) |
| *G01G 13/24* | (2006.01) |
| *F27D 19/00* | (2006.01) |
| *B65G 33/14* | (2006.01) |
| *F27B 1/20* | (2006.01) |
| *F27D 3/00* | (2006.01) |
| *G01F 13/00* | (2006.01) |
| *G01G 11/08* | (2006.01) |

(52) U.S. Cl.
CPC .......... *F27D 3/0025* (2013.01); *F27D 3/0033* (2013.01); *F27D 19/00* (2013.01); *G01F 1/86* (2013.01); *G01F 13/005* (2013.01); *G01G 11/083* (2013.01); *G01G 11/086* (2013.01); *G01G 13/24* (2013.01)

(58) Field of Classification Search
CPC ...... F27D 3/08; G01G 11/083; G01G 11/086; G01G 13/24; G01F 13/005; G01F 1/86

USPC .......... 266/197, 265, 266, 267, 216; 75/386, 75/639, 649, 641, 643, 638, 659; 414/21, 414/171, 175, 197

See application file for complete search history.

(56) References Cited

U.S. PATENT DOCUMENTS

| | | | |
|---|---|---|---|
| 6,446,836 B1* | 9/2002 | Aalto | G01G 13/248 222/1 |
| 2009/0226284 A1* | 9/2009 | Kojo | C22B 15/0047 414/161 |

FOREIGN PATENT DOCUMENTS

| | | |
|---|---|---|
| JP | 58-063630 | 4/1983 |
| WO | 99/63310 | 12/1999 |
| WO | 2005/067366 | 7/2005 |

OTHER PUBLICATIONS

Search report from priority Finnish Application No. 20125966, dated Jul. 19, 2013, 1 pg.
Search report from priority International Application No. PCT/FI2013/050901, dated Jan. 7, 2014, 5 pgs.

* cited by examiner

METHOD AND ARRANGEMENT FOR FEEDING FINE-GRAINED MATTER TO A CONCENTRATE BURNER OR A MATTE BURNER OF A SUSPENSION SMELTING FURNACE AND CONTROLLING MEANS AND COMPUTER PROGRAM PRODUCT

CROSS-REFERENCE TO RELATED APPLICATIONS

This is a national stage application filed under 35 USC 371 based on International Application No. PCT/FI2013/050901 filed Sep. 18, 2013, and claims priority under 35 USC 119 of Finnish Patent Application No. 20125966 filed Sep. 19, 2012.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION.

The invention relates to a method for feeding fine-grained matter to a concentrate burner or a matte burner of a suspension smelting furnace.

The invention also relates to an arrangement for feeding fine-grained matter to a concentrate burner or the matte burner of a suspension smelting furnace.

The invention also relates also to a controlling means for controlling feeding of fine-grained matter to a concentrate burner or a matte burner of a suspension smelting furnace in an arrangement for feeding fine-grained matter to a concentrate burner or a matte burner of a suspension smelting furnace.

Lost in weight feeding is based on measuring the mass of the material in a dosing bin and continuously calculating the change in mass (with respect to time) thus obtaining the mass flow rate from measured data. This mass flow rate can be used for continuously adjusting the speed of a screw conveyor in communication with the dosing bin to obtain an even flow of material to be fed from the screw conveyor. However, during filling of the dosing bin the mass flow calculation cannot be used due to sudden increase of mass in the dosing bin. The speed of the screw conveyor is therefore normally kept constant during filling of the dosing bin. After the filling is over, the screw conveyor is released and the feed rate is again adjusted based on the measured weight change as was made before the filling. A problem is that the optimum screw speed after the filling is totally different from the optimum screw speed prior to the filling, which leads to underfeeding or overfeeding of material after the filling. Especially in arrangements for feeding fine-grained matter to a concentrate burner or the matte burner of a suspension smelting furnace underfeeding or overfeeding fine-grained matter of has a negative effect on the process, because for example a too high feed rate leads to unburned fine-grained matter in the suspension smelting furnace.

Systems for feeding fine-grained matter to a concentrate burner or a matte burner of a suspension smelting furnace are for example presented in publication WO 2005/067366.

BRIEF SUMMARY OF THE INVENTION

The object of the invention is to provide an improved method and an improved arrangement for feeding fine-grained matter to a concentrate burner or a matte burner of a suspension smelting furnace.

BRIEF DESCRIPTION OF THE SEVERAL VIEWS OF THE DRAWINGS

In the following the invention will described in more detail by referring to the figures, of which FIG. 1 show a suspension smelting furnace provided with a concentrate burner or a matte burner, FIG. 2 show an embodiment of an arrangement for feeding fine-grained matter to a concentrate burner or a matte burner of a suspension smelting furnace.

DETAILED DESCRIPTION OF THE INVENTION

Figure 1:
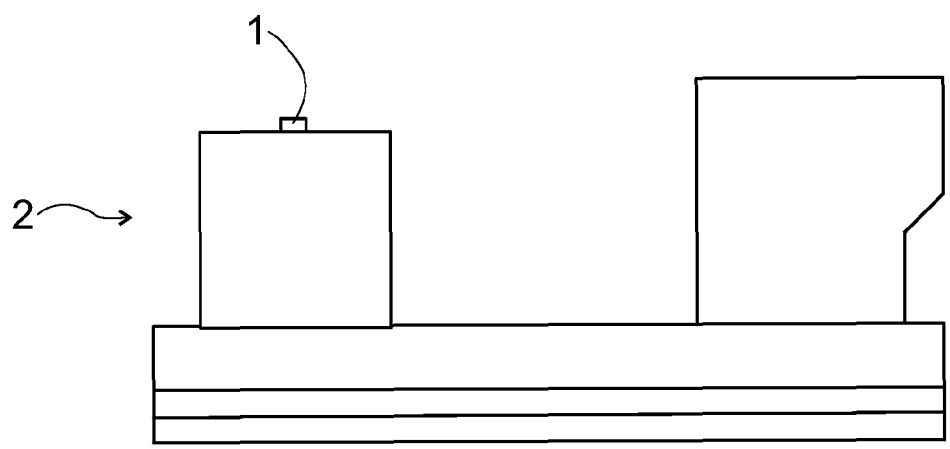

The invention relates to a method and to an arrangement for feeding fine-grained matter such as copper or nickel concentrate, matte and/or flux (not shown in the figures) to a concentrate burner 1 or a matte burner of a suspension smelting furnace 2.

First the method for feeding fine-grained matter to a concentrate burner or a matte burner of a suspension smelting furnace 2 and some preferred embodiments and variants thereof will be described in greater detail.

The method comprises a dosing step for feeding fine-grained matter from a dosing bin 3 to a screw conveyor 4 that is in communication with the concentrate burner 1 or the matte burner of the suspension smelting furnace 2. The screw conveyor 4 can be in direct communication with the concentrate burner 1 or the matte burner of the suspension smelting furnace 2, or a shown in FIG. 2, be in indirect communication with the concentrate burner 1 or the matte burner of the suspension smelting furnace 2 for example matter by means of an air slide 5 that is in communication with the screw conveyor 4 or the concentrate burner 1 or the matte burner of the suspension smelting furnace 2.

The method comprises continuously measuring the mass of the fine-grained matter that is fed from the dosing bin 3 to the screw conveyor 4 by means of a loss-in-weight means 6 and calculating a mass flow rate by using the continuously measured mass of the fine-grained matter that is fed from the dosing bin 3 to the screw conveyor 4.

The method comprises continuously adjusting the speed of the screw conveyor 4 based on the mass flow rate.

Figure 3:
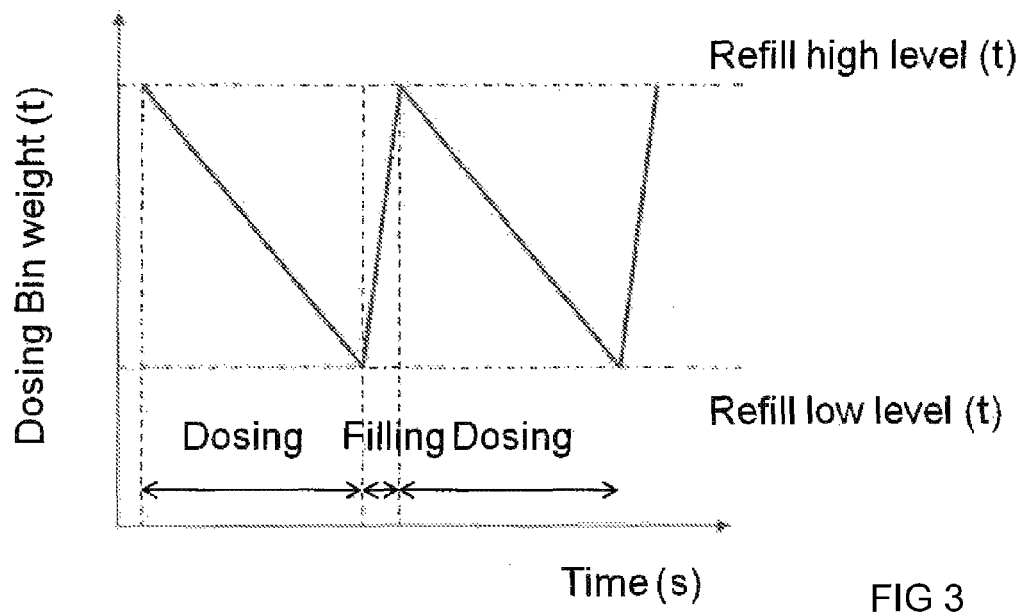
FIG. 3 is a diagram illustrating the mass of the fine-grained matter in the dosing bin in with respect to time in one embodiment of the method and of the arrangement.

The method comprises determining the mass of the fine-grained matter in the dosing bin 3 and performing a filling step for filling fine-grained matter into the dosing bin 3 from a filling bin 7 located at a level above the dosing bin 3, if the weight of the fine-grained matter in the dosing bin 3 goes below a refill low level, wherein the filling step includes opening a filling valve 8 between the dosing bin 3 and the filling bin 7 to let fine-grained matter in the filling bin 7 to flow into the dosing bin 3, and subsequently closing the filling valve 8 when the weight of the fine-grained matter in the dosing bin 3 goes above a pre-set high-limit. FIG. 3 is a diagram illustrating the weight of the fine-grained matter in the dosing bin 3 with respect to time during the dosing step and the filling step. A fluidization arrangement 9 may be used in the filling bin 7.

The method comprises a step (i) for calculating after closing the filling valve (8) in a number (N) of subsequent filling steps a feed rate difference (DIFF) between a process value (PV) for the actual feed rate and a predetermined set point (SP) for the feed rate by subtracting the predetermined set point (SP) for the feed rate from the process value (PV) for the actual feed rate.

The method comprises additionally a step (ii) for adding together the calculated feed rate differences (DIFF) obtained in step (i) to obtain a sum of the calculated feed rate differences SUM (DIFF).

The method comprises additionally a step (iii) for calculating of a ramp parameter (OUT) by using at least one coefficient and the sum of the calculated feed rate differences SUM(DIFF) obtained in step (ii) to obtain a ramp parameter (OUT).

The method comprises additionally a step (iv) adjusting the speed of the screw conveyor (4) during the filling step subsequent to the last filling step used for the calculation in point (i) by using the ramp parameter (OUT) obtained in step (iii).

The method comprises preferably, but not necessarily, calculating the feed rate difference (DIFF) for a number (N) of 2 to 7, preferably for a number (N) of 3 to 6, more preferably for a number (N) of 4 to 5 subsequent filling steps in step (i) so that the ramp parameter (OUT) to be calculated in step (iii) is based on the feed rate differences (OUT) after closing the filling valve 8 in 2 to 7, preferably 3 to 6, more preferably 4 to 5 preceding filling steps.

In a preferred embodiment of the method, steps (i) to (iv) are repeated once after closing the filling valve 8 in every filling period so that a ramp parameter (OUT) in the form of a new ramp parameter (OUT) is calculated each time step (iii) is performed.

The process value (PV) is preferably, but not necessarily, calculated in step (i) within a predetermined measuring time-period that at the earliest begins at the moment the filling valve (8) is closed in the filling step and that at the latest ends at the moment the filling valve (8) is again opened in the following filling step.

In a preferred embodiment of the method, steps (i) to (iv) are repeated once after closing the filling valve 8 in every filling period so that a ramp parameter (OUT) in the form of a new ramp parameter (OUT) is calculated each time step (iii) is performed In a preferred embodiment of the method, if when calculating for a number (N) of subsequent dosing steps a feed rate difference (DIFF) in step (i) the calculated feed rate difference (DIFF) changes from positive to negative or from negative to positive when compared to the previously calculated feed rate difference (DIFF), in step (ii) only the calculated feed rate differences (DIFF) of the number (N) of subsequent dosing steps calculated prior said changing of the calculated feed rate difference (DIFF) from positive to negative or from negative to positive when compared to the previously calculated feed rate difference (DIFF) are summed together to obtain said sum of the calculated feed rate differences SUM(DIFF).

In another preferred embodiment of the method, steps (i) to (iv) are repeated once after closing the filling valve 8 in every filling period so that a ramp parameter (OUT) in the form of a new ramp parameter (OUT) is calculated each time step (iii) is performed. In this preferred embodiment of the method step (iii) includes preferably, but not necessarily, storing the new ramp parameter (OUT) as a most-recent calculated ramp parameter (OUT). In this preferred embodiment of the method if, when calculating a new ramp parameter (OUT) in a step (iii), the calculated new ramp parameter (OUT) changes from positive to negative or from negative to positive when compared to the stored most-recent calculated ramp parameter (OUT), the stored most-recent calculated ramp parameter (OUT) is used in step (iv) instead of the new calculated ramp parameter (OUT) calculated in step (iii).

In the method a coefficient in the form of the number of calculated feed rate differences (DIFF) summed together in step (ii) to obtain a ramp parameter (OUT) is preferably, but not necessarily used, so that said calculating of a ramp parameter in step (iii) is performed by dividing the sum of calculated feed rate differences SUM(DIFF) obtained in step (ii) with the number of calculated feed rate difference (DIFF) summed together in step (ii) to obtain a ramp parameter (OUT).

In the method a coefficient in the form of a scale coefficient or a filtering coefficient can be used in step (iii), so that said calculating of a ramp parameter in step (iii) is performed by for example dividing or multiplying the sum of calculated feed rate differences SUM(DIFF) obtained in step (ii) with the scale coefficient or filtering coefficient to obtain a ramp parameter (OUT).

The filling step consists preferably, but not necessarily, of several sub-steps.

Figure 4:
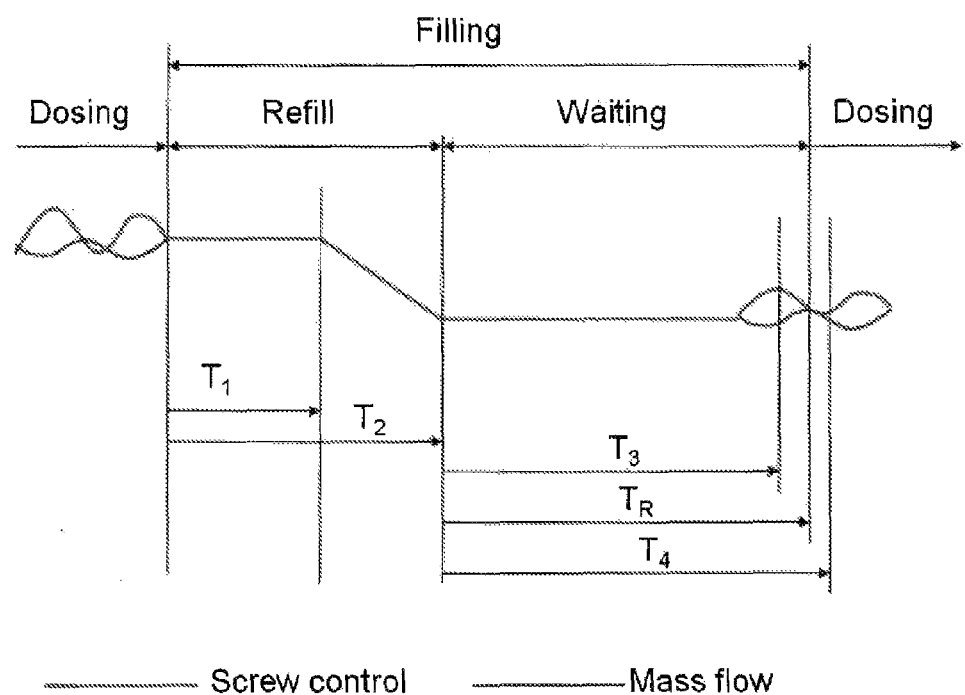
FIG. 4 is a diagram illustrating the speed of the screw conveyor with respect to the time and during various phases in one embodiment of the method and of the arrangements.

In the embodiment of the method referred to in FIG. 4, the filling step consists of a refill period during which the filling valve 8 is open to let fine-grained matter to flow from the filling bin 7 into the dosing bin 3, and a waiting period following the refill period during which the filling valve 8 is closed and fine-grained matter is let to settle in the dosing bin 3. In this preferred embodiment of the invention the speed of the screw conveyor 4 is adjusted according to step (iv) during the refill period of the filling step. Such refill period may consist of sub-stages. In the embodiment of the method shown in FIG. 4, the refill period consist of a first refill period stage during which the speed of the screw conveyor 4 is kept constant, and a second refill period stage during which the speed of the screw conveyor 4 is adjusted according to step (iv). A such first refill period stage may be performed for a pre-determined time (T1) and a such second refill period stage may be performed for a pre-determined time (T2). If the filling period includes a waiting period, the speed of the screw conveyor 4 is preferably, but not necessarily, kept constant during at least a part of the waiting period.

Next the arrangement for feeding fine-grained matter to a concentrate burner 1 or a matte burner of a suspension smelting furnace 2 and some preferred embodiments and variants thereof will be described in greater detail.

The arrangement comprises a dosing bin 3 for during a dosing step and during a filling step feeding fine-grained matter to a screw conveyor 4 that is connected to the concentrate burner 1 or the matte burner of the suspension smelting furnace 2. The screw conveyor 4 can be directly connected to the concentrate burner 1 or the matte burner of the suspension smelting furnace 2, or a shown in FIG. 2, indirectly connected to the concentrate burner 1 or the matte burner of the suspension smelting furnace 2 for example matter by means of one or several air slide(s) 5 that is (are) connected to the screw conveyor 4 and the concentrate burner 1 or the matte burner of the suspension smelting furnace 2.

The arrangement comprises a filling bin 7 that is located at a level above the dosing bin 3. The filling bin 7 may include a fluidization arrangement 9.

The arrangement comprises loss-in-weight means 6 for continuously measuring the mass of the fine-grained matter that is fed from the dosing bin 3 to the screw conveyor 4 and for measuring the weight of the fine-grained matter in the dosing bin 3.

The arrangement is configured for calculating a mass flow rate by using the continuously measured mass of the fine-grained matter that is fed from the dosing bin 3 to the screw conveyor 4.

The arrangement is configured for continuously adjusting the speed of the screw conveyor 4 based on the mass flow rate.

The arrangement comprises a filling valve 8 between the dosing bin 3 and the filling bin 7 for opening and closing a communication between the dosing bin 3 and the filling bin 7. The filling valve 8 is configured for performing the filling step if the weight of the fine-grained matter in the dosing bin 3 goes below a pre-set low limit by opening the communication between the dosing bin 3 and the filling bin 7, and subsequently by closing the communication between the dosing bin 3 and the filling bin 7 when the weight of the fine-grained matter in the dosing bin 3 goes above a pre-set high-limit.

The arrangement comprises a controlling means 10 configured for performing the following steps (i) to (iv):

A step (i) for calculating after closing the filling valve (8) in a number (N) of subsequent filling steps a feed rate difference (DIFF) between a process value (PV) for the actual feed rate and a predetermined set point (SP) for the feed rate by subtracting the predetermined set point (SP) for the feed rate from the process value (PV) for the actual feed rate.

A step (ii) for adding together the calculated feed rate differences (DIFF) obtained in step (i) to obtain a sum of the calculated feed rate differences SUM(DIFF).

A step (iii) for calculating of a ramp parameter (OUT) by using at least one coefficient and the sum of the calculated feed rate differences SUM(DIFF) obtained in step (ii) to obtain a ramp parameter (OUT).

A step (iv) for adjusting the speed of the screw conveyor (4) during the filling step subsequent to the last filling step used for the calculation in point (i) by using the ramp parameter (OUT) obtained in step (iii).

In the arrangement the controlling 10 means are preferably, but not necessarily, configured for calculating the feed rate difference (DIFF) for a number (N) of 2 to 7, preferably for a number (N) of 3 to 6, more preferably for a number (N) of 4 to 5 subsequent filling steps in step (i) so that the ramp parameter (OUT) to be calculated in step (iii) is based on the feed rate differences (OUT) after closing the filling valve 8 in 2 to 7, preferably 3 to 6, more preferably 4 to 5 preceding filling steps.

In the arrangement the controlling means 10 are preferably, but not necessarily, configured for repeating steps (i) to (iv) once after closing the filling valve 8 in every filling period so that a ramp parameter (OUT) in the form of a new ramp parameter (OUT) is calculated each time step (iii) is performed.

In the arrangement the controlling means 10 are preferably, but not necessarily, configured for calculating the process value (PV) in step (i) within a predetermined measuring time-period that at the earliest begins at the moment the filling valve (8) is closed in the filling step and that at the latest ends at the moment the filling valve (8) is again opened in the following filling step.

In a preferred embodiment of the arrangement, the controlling means 10 are configured for, if when calculating for a number (N) of subsequent dosing steps a feed rate difference (DIFF) in step (i) the calculated feed rate difference (DIFF) changes from positive to negative or from negative to positive when compared to the previously calculated feed rate difference (DIFF), to in step (ii) summing together only the calculated feed rate differences (DIFF) of the number (N) of subsequent dosing steps calculated prior said changing of the calculated feed rate difference (DIFF) from positive to negative or from negative to positive when compared to the previously calculated feed rate difference (DIFF) to obtain said sum of the calculated feed rate differences SUM(DIFF).

In another preferred embodiment of the arrangement, the controlling means 10 are configured for repeating steps (i) to (iv) once after closing the filling valve 8 in every filling period so that a ramp parameter (OUT) in the form of a new ramp parameter (OUT) is calculated each time step (iii) is performed. In this preferred embodiment of the arrangement, the controlling means 10 are configured for storing the new ramp parameter (OUT) obtained in step (iii) as a most-recent calculated ramp parameter (OUT). In this preferred embodiment of the arrangement, the controlling means 10 are configured for, if when calculating a new ramp parameter (OUT) in a step (iii), the calculated new ramp parameter (OUT) changes from positive to negative or from negative to positive when compared to the stored most-recent calculated ramp parameter (OUT), to use in step (iv) the stored most-recent calculated ramp parameter (OUT) instead of the new calculated ramp parameter (OUT) calculated in step (iii).

In the arrangement the controlling means 10 may be configured for using in step (iii) a coefficient in the form of the number of calculated feed rate differences (DIFF) summed together in step (ii) to obtain a ramp parameter (OUT) so that the controlling means 10 is configured for said calculating of a ramp parameter (OUT) in step (iii) by dividing the sum of calculated feed rate differences SUM (DIFF) obtained in step (ii) with the number of calculated feed rate difference (DIFF) summed together in step (ii) to obtain a ramp parameter (OUT).

In the arrangement the controlling means 10 may be configured for using in step (iii) a coefficient in the form of a scale coefficient or a filtering coefficient so that the controlling means 10 is configured for said calculating of a ramp parameter (OUT) in step (iii) by for example dividing or multiplying the sum of calculated feed rate differences SUM(DIFF) obtained in step (ii) with the scale coefficient or filtering coefficient to obtain a ramp parameter (OUT).

The arrangement is in an embodiment of the arrangement configured for performing a filling step consisting of a refill period during which the filling valve 8 is open to let fine-grained matter to flow from the filling bin 7 into the dosing bin 3, and a waiting period following the refill period during which the filling valve 8 is closed and fine-grained matter is left to settle in the dosing bin 3. In this embodiment of the arrangement, the controlling means are configured for adjusting the speed of the screw conveyor 4 during the refill period according to step (iv). If the arrangement is configured for performing a filling step including a such refill period, the arrangement may be configured for performing a refill period consisting of a first refill period stage during which the arrangement is configured for keeping the speed of the screw conveyor 4 constant, and subsequent to the first refill period stage a second refill period stage during which the controlling means is configured for adjusting the speed of the screw conveyor 4 according to step (iv). The arrangement may be configured for performing a such first refill period stage a pre-determined time (T1) and a such second refill period stage may for a pre-determined time (T2). If the filling period includes a waiting period, the arrangement is preferably, but not necessarily, configured for keeping speed of the screw conveyor 4 constant during at least a part of the waiting period.

The invention relates also to a controlling means for controlling feeding of fine-grained matter to a concentrate burner 1 or a matte burner of a suspension smelting furnace 2 in an arrangement for feeding fine-grained matter to a concentrate burner 1 or a matte burner of a suspension smelting furnace 2.

The arrangement comprises a dosing bin 3 for during a dosing step and a during filling step feeding fine-grained matter to a screw conveyor 4 that is in communication with the concentrate burner 1 or the matte burner of the suspension smelting furnace 2.

The arrangement comprises additionally a filling bin 7 that is located at a level above the dosing bin 3.

The arrangement comprises additionally a loss-in-weight means for continuously measuring the mass of the fine-grained matter that is fed from the dosing bin 3 to the screw conveyor 4 and for measuring the weight of the fine-grained matter in the dosing bin 3.

The arrangement is configured calculating a mass flow rate by using the continuously measured mass of the fine-grained matter that is fed from the dosing bin 3 to the screw conveyor 4.

The arrangement is configured for continuously adjusting the speed of the screw conveyor 4 based on the mass flow rate.

The arrangement comprises a filling valve 8 between the dosing bin 3 and the filling bin 7 for opening and closing a communication between the dosing bin 3 and the filling bin 7. The filling valve 8 is configured for performing said filling step if the weight of the fine-grained matter in the dosing bin 3 goes below a pre-set low limit by opening the communication between the dosing bin 3 and the filling bin 7, and subsequently by closing the communication between the dosing bin 3 and the filling bin 7 when the weight of the fine-grained matter in the dosing bin 3 goes above a pre-set high-limit.

The controlling means are configured for performing the following steps:

A step (i) for calculating after closing the filling valve (8) in a number (N) of subsequent filling steps a feed rate difference (DIFF) between a process value (PV) for the actual feed rate and a predetermined set point (SP) for the feed rate by subtracting the predetermined set point (SP) for the feed rate from the process value (PV) for the actual feed rate.

A step (ii) for adding together the calculated feed rate differences (DIFF) obtained in step (i) to obtain a sum of the calculated feed rate differences SUM(DIFF).

A step (iii) for calculating of a ramp parameter (OUT) by using at least one coefficient and the sum of the calculated feed rate differences SUM(DIFF) obtained in step (ii) to obtain a ramp parameter (OUT).

A step (iv) for adjusting the speed of the screw conveyor (4) during the filling step subsequent to the last filling step used for the calculation in point (i) by using the ramp parameter (OUT) obtained in step (iii).

The controlling means 10 are preferably, but not necessarily, configured for calculating the feed rate difference (DIFF) for a number (N) of 2 to 7, preferably for a number (N) of 3 to 6, more preferably for a number (N) of 4 to 5 subsequent dosing steps in step (i) so that the ramp parameter (OUT) to be calculated in step (iii) is based on the feed rate differences (OUT) after closing the filling valve 8 in 2 to 7, preferably 3 to 6, more preferably 4 to 5 preceding filling steps.

The controlling means 10 are preferably, but not necessarily, configured for repeating steps (i) to (iv) once after closing the filling valve 8 in every filling period so that a ramp parameter (OUT) in the form of a new ramp parameter (OUT) is calculated each time step (iii) is performed.

The controlling means 10 are preferably, but not necessarily, configured for calculating the process value (PV) in step (i) within a predetermined measuring time-period that at the earliest begins at the moment the filling valve (8) is closed in the filling step and that at the latest ends at the moment the filling valve (8) is again opened in the following filling step.

In another preferred embodiment of the controlling means 10, the controlling means 10 are configured for, if when calculating for a number (N) of subsequent dosing steps a feed rate difference (DIFF) in step (i) the calculated feed rate difference (DIFF) changes from positive to negative or from negative to positive when compared to the previously calculated feed rate difference (DIFF), to in step (ii) summing together only the calculated feed rate differences (DIFF) of the number (N) of subsequent dosing steps calculated prior said changing of the calculated feed rate difference (DIFF) from positive to negative or from negative to positive when compared to the previously calculated feed rate difference (DIFF) to obtain said sum of the calculated feed rate differences SUM(DIFF).

In another preferred embodiment of the controlling means 10, the controlling means 10 are configured for repeating steps (i) to (iv) once after closing the filling valve 8 in every filling period so that a ramp parameter (OUT) in the form of a new ramp parameter (OUT) is calculated each time step (iii) is performed. In this preferred embodiment of the arrangement, the controlling means 10 are configured for storing the new ramp parameter (OUT) obtained in step (iii) as a most-recent calculated ramp parameter (OUT). In this preferred embodiment of the arrangement, the controlling means 10 are configured for, if when calculating a new ramp parameter (OUT) in a step (iii), the calculated new ramp parameter (OUT) changes from positive to negative or from negative to positive when compared to the stored most-recent calculated ramp parameter (OUT), to use in step (iv) the stored most-recent calculated ramp parameter (OUT) instead of the new calculated ramp parameter (OUT) calculated in step (iii).

The controlling means 10 may be configured for using in step (iii) a coefficient in the form of the number of calculated feed rate differences (DIFF) summed together in step (ii) to obtain a ramp parameter (OUT) so that the controlling means 10 is configured for said calculating of a ramp parameter (OUT) in step (iii) by dividing the sum of calculated feed rate differences SUM(DIFF) obtained in step (ii) with the number of calculated feed rate difference (DIFF) summed together in step (ii) to obtain a ramp parameter (OUT).

The controlling means 10 may be configured for using in step (iii) a coefficient in the form of a scale coefficient or a filtering coefficient so that the controlling means 10 is configured for said calculating of a ramp parameter (OUT) in step (iii) by for example dividing or multiplying the sum of calculated feed rate differences SUM(DIFF) obtained in step (ii) with the scale coefficient or filtering coefficient to obtain a ramp parameter (OUT).

Figure 5:
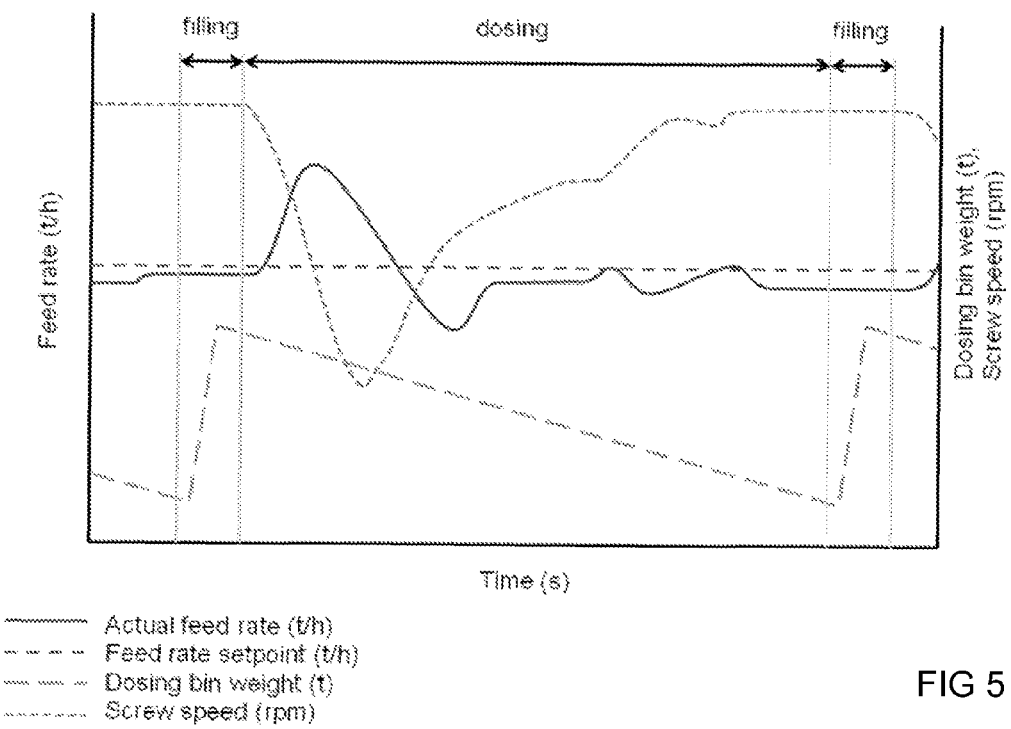
FIG. 5 is a diagram showing the operation of an arrangement according to the prior art.

FIG. 5 is a diagram showing the actual feed rate (t/h), weight of the fine-grained matter in the dosing bin 3, and the speed of the screw conveyor with respect to time during the dosing steps and the filling steps in an embodiment according to the prior art. In the embodiment illustrated in FIG. 5 the speed of the screw conveyor is kept constant at the level as the speed of the screw conveyor was at the beginning of the filling step. This leads to that when the speed of the screw conveyor 4 is again after the filling step adjusted in accordance with the mass flow rate from the dosing bin 3 to the screw conveyor 4 to as close as possible be the same as the predetermined set point for the feed rate, a relatively high peak in the actual feed rate occurs before the speed of the screw conveyor is adapted to the increased flow of fine-grained matter from the dosing bin 3 resulting from the increased amount of fine-grained matter in the dosing bin 3.

Figure 6:
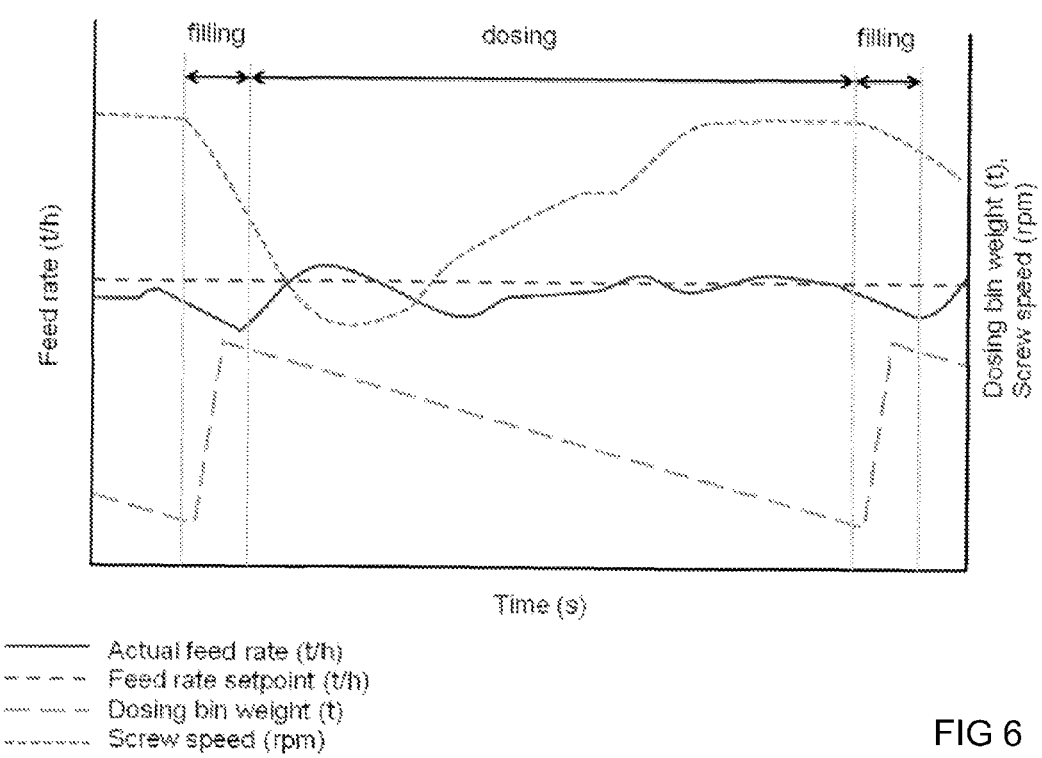
FIG. 6 is a diagram showing the operation of an arrangement according to one embodiment of the method and the arrangement.

FIG. 6 is a diagram showing the actual feed rate (t/h), weight of the fine-grained matter in the dosing bin 3, and the speed of the screw conveyor with respect to time during the dosing steps and the filling steps in an embodiment according to the invention. In the embodiment illustrated in FIG. 6 the speed of the screw conveyor is adjusted during the filling step by using the ramp parameter calculated in step (iii). This leads to that when the speed of the screw conveyor 4 is again after the filling step adjusted in accordance with the mass flow rate from the dosing bin 3 to the screw conveyor 4 to as close as possible be the same as the predetermined set point for the feed rate, a much lower high peak in the actual feed rate occurs in comparison to the situation in FIG. 5 before the speed of the screw conveyor is adapted to the increased flow of fine-grained matter from the dosing bin 3 resulting from the increased amount of fine-grained matter in the dosing bin 3.

The invention relates also to computer program product directly loadable into the memory of a computer for controlling the steps (i) to (iv) of the method, of the arrangement, or of the controlling means when said computer program product is run on a computer.

It is apparent to a person skilled in the art that as technology advances, the basic idea of the invention can be implemented in various ways. The invention and its embodiments are therefore not restricted to the above examples, but they may vary within the scope of the claims.

The invention claimed is:

1. A method for feeding fine-grained matter to a concentrate burner or a matte burner of a suspension smelting furnace, wherein the method comprises
    a dosing step for feeding fine-grained matter from a dosing bin to a screw conveyor that is in communication with the concentrate burner or the matte burner of the suspension smelting furnace,
    continuously measuring the mass of the fine-grained matter that is fed from the dosing bin to the screw conveyor by means of a loss-in-weight means and calculating a mass flow rate by using the continuously measured mass of the fine-grained matter that is fed from the dosing bin to the screw conveyor,
    continuously adjusting the speed of the screw conveyor based on the mass flow rate, and
    determining the mass of the fine-grained matter in the dosing bin and performing a filling step for filling fine-grained matter into the dosing bin from a filling bin located at a level above the dosing bin, if the weight of the fine-grained matter in the dosing bin goes below a refill low level, wherein the filling step includes opening a filling valve between the dosing bin and the filling bin to let fine-grained matter in the filling bin to flow into the dosing bin, and subsequently closing the filling valve when the weight of the fine-grained matter in the dosing bin goes above a pre-set high-limit,
    characterized by the following steps:
    (i) calculating after closing the filling valve in a number of subsequent filling steps a feed rate difference between a process value for the actual feed rate and a predetermined set point for the feed rate by subtracting the predetermined set point for the feed rate from the process value for the actual feed rate,
    (ii) adding together the calculated feed rate differences obtained in step (i) to obtain a sum of the calculated feed rate differences,
    (iii) calculating of a ramp parameter by using at least one coefficient in a form of the number of calculated feed rate differences summed together in step (ii) and by dividing the sum of the calculated feed rate differences obtained in step (ii) with the coefficient to obtain the ramp parameter, and
    (iv) adjusting the speed of the screw conveyor during the filling step subsequent to the last filling step used for the calculation in step (i) by using the ramp parameter obtained in step (iii);
    further characterized
    by if when calculating for a number of subsequent dosing steps a feed rate difference in step (i) the calculated feed rate difference changes from positive to negative or from negative to positive when compared to a previously calculated feed rate difference, in step (ii) only the calculated feed rate differences of the number of subsequent dosing steps calculated prior said changing of the calculated feed rate difference from positive to negative or from negative to positive when compared to the previously calculated feed rate difference are summed together to obtain said sum of the calculated feed rate differences.

2. The method according to claim 1, characterized
    by calculating the process value in step (i) within a predetermined measuring timeperiod that at earliest begins at a moment the filling valve is closed in the filling step and that at the latest ends at a moment the filling valve is again opened in the following filling step.

3. The method according to claim 1, characterized
by the steps (i) to (iv) in claim 1 are repeated once after closing the filling valve in every filling period so that a ramp parameter in a form of a new ramp parameter is calculated each time step (iii) is performed.

4. The method according to claim 1, characterized by the filling step consists of
a refill period during which the filling valve is open to let fine-grained matter to flow from the filling bin into the dosing bin,
and a waiting period following the refill period during which the filling valve is closed and fine-grained matter is let to settle in the dosing bin, and by adjusting the speed of the screw conveyor during the refill period according to step (iv).

5. The method according to claim 4, characterized
by the refill period consists of
a first refill period stage during which the speed of the screw conveyor is kept constant, and
a second refill period stage during which the speed of the screw conveyor is adjusted according to step (iv).

6. The method according to claim 4, characterized
by keeping the speed of the screw conveyor constant during at least a part of the waiting period.

7. A method for feeding fine-grained matter to a concentrate burner or a matte burner of a suspension smelting furnace, wherein the method comprises
a dosing step for feeding fine-grained matter from a dosing bin to a screw conveyor that is in communication with the concentrate burner or the matte burner of the suspension smelting furnace,
continuously measuring the mass of the fine-grained matter that is fed from the dosing bin to the screw conveyor by means of a loss-in-weight means and calculating a mass flow rate by using the continuously measured mass of the fine-grained matter that is fed from the dosing bin to the screw conveyor,
continuously adjusting the speed of the screw conveyor based on the mass flow rate, and
determining the mass of the fine-grained matter in the dosing bin and performing a filling step for filling fine-grained matter into the dosing bin from a filling bin located at a level above the dosing bin, if the weight of the fine-grained matter in the dosing bin goes below a refill low level, wherein the filling step includes opening a filling valve between the dosing bin and the filling bin to let fine-grained matter in the filling bin to flow into the dosing bin, and subsequently closing the filling valve when the weight of the fine-grained matter in the dosing bin goes above a pre-set high-limit,
characterized by the following steps:
(i) calculating after closing the filling valve in a number of subsequent filling steps a feed rate difference between a process value for the actual feed rate and a predetermined set point for the feed rate by subtracting the predetermined set point for the feed rate from the process value for the actual feed rate,
(ii) adding together the calculated feed rate differences obtained in step (i) to obtain a sum of the calculated feed rate differences,
(iii) calculating of a ramp parameter by using at least one coefficient in a form of the number of calculated feed rate differences summed together in step (ii) and by dividing the sum of the calculated feed rate differences obtained in step (ii) with the coefficient to obtain the ramp parameter, and
(iv) adjusting the speed of the screw conveyor during the filling step subsequent to the last filling step used for the calculation in step (i) by using the ramp parameter obtained in step (iii);
further characterized
by the steps (i) to (iv) in claim 1 are repeated once after closing the filling valve in every filling period so that a ramp parameter in a form of a new ramp parameter is calculated each time step (iii) is performed; and
by step (iii) includes storing the new ramp parameter as a most-recent calculated ramp parameter, and
by if when calculating a new ramp parameter in a step (iii), the calculated new ramp parameter changes from positive to negative or from negative to positive when compared to a most-recent calculated ramp parameter, the most-recent calculated ramp parameter is used in step (iv) instead of the new calculated ramp parameter calculated in step (iii).

8. The method according to claim 7, characterized
by calculating the process value in step (i) within a predetermined measuring timeperiod that at earliest begins at a moment the filling valve is closed in the filling step and that at the latest ends at a moment the filling valve is again opened in the following filling step.

9. The method according to claim 7, characterized by the filling step consists of
a refill period during which the filling valve is open to let fine-grained matter to flow from the filling bin into the dosing bin,
and a waiting period following the refill period during which the filling valve is closed and fine-grained matter is let to settle in the dosing bin, and by adjusting the speed of the screw conveyor during the refill period according to step (iv).

10. The method according to claim 9, characterized
by the refill period consists of
a first refill period stage during which the speed of the screw conveyor is kept constant, and
a second refill period stage during which the speed of the screw conveyor is adjusted according to step (iv).

11. The method according to claim 9, characterized
by keeping the speed of the screw conveyor constant during at least a part of the waiting period.

* * * * *

UNITED STATES PATENT AND TRADEMARK OFFICE
CERTIFICATE OF CORRECTION

PATENT NO. : 9,851,150 B2  
APPLICATION NO. : 14/421972  
DATED : December 26, 2017  
INVENTOR(S) : Peter Björklund Page 1 of 1

It is certified that error appears in the above-identified patent and that said Letters Patent is hereby corrected as shown below:

In the Specification

Column 2, Line 25 "In the following the invention will described in more..." should be -- In the following the invention will be described in more... --

Column 2, Line 27 "FIG. 1 show a suspension smelting furnace..." should be -- FIG.1 shows a suspension smelting furnace... --

Figure 2:
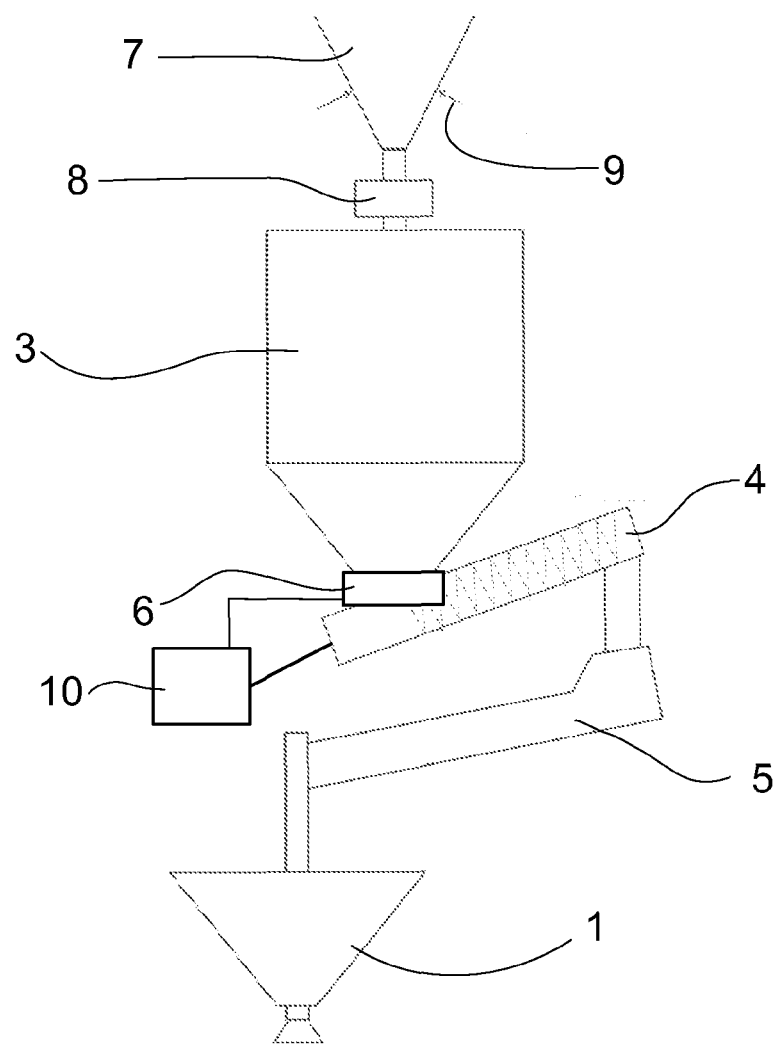

Column 2, Line 29 "FIG.2 show an embodiment of an arrangement..." should be -- FIG.2 shows an embodiment of an arrangement... --

Column 2, Line 62 "...smelting furnace 2, or a shown in FIG.2,..." should be -- ...smelting furnace 2, or as shown in FIG.2.,... --

Column 4, Line 61 "... the refill period consist of a first..." should be -- ... the refill period consists of a first... --

Column 5, Line 15 "...or a shown in FIG. 2.,..." should be -- ... or as shown in FIG. 2.,... --

Signed and Sealed this  
Sixth Day of November, 2018

Andrei Iancu  
*Director of the United States Patent and Trademark Office*